United States Patent
Katayama et al.

(10) Patent No.: US 11,647,331 B2
(45) Date of Patent: May 9, 2023

(54) CIRCUIT DEVICE, SOUND REPRODUCTION DEVICE, AND ELECTRONIC APPARATUS

(71) Applicant: SEIKO EPSON CORPORATION, Tokyo (JP)

(72) Inventors: Takao Katayama, Matsumoto (JP); Fumihito Baisho, Kai (JP); Tsutomu Nonaka, Hino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 12 days.

(21) Appl. No.: 17/081,288

(22) Filed: Oct. 27, 2020

(65) Prior Publication Data

US 2021/0127206 A1 Apr. 29, 2021

(30) Foreign Application Priority Data

Oct. 29, 2019 (JP) .............................. JP2019-195975

(51) Int. Cl.
*H04R 3/04* (2006.01)
*G06F 3/16* (2006.01)

(52) U.S. Cl.
CPC ................ *H04R 3/04* (2013.01); *G06F 3/16* (2013.01); *H04R 2430/03* (2013.01)

(58) Field of Classification Search
CPC .......... H04R 3/04; H04R 2430/03; G06F 3/16
See application file for complete search history.

(56) References Cited

U.S. PATENT DOCUMENTS

| | | | | |
|---|---|---|---|---|
| 9,319,789 | B1 * | 4/2016 | Nielsen | H03G 5/025 |
| 2006/0159283 | A1 * | 7/2006 | Mathew | H04R 3/04 |
| | | | | 381/98 |
| 2009/0016543 | A1 * | 1/2009 | Maruko | H04R 3/04 |
| | | | | 381/104 |
| 2009/0216353 | A1 * | 8/2009 | Van Reck | H04R 3/04 |
| | | | | 700/94 |
| 2011/0235815 | A1 * | 9/2011 | Hiselius | H04R 3/04 |
| | | | | 381/62 |
| 2014/0233744 | A1 * | 8/2014 | Risberg | H04R 3/002 |
| | | | | 381/61 |
| 2014/0341394 | A1 * | 11/2014 | Croft, III | H04R 1/2819 |
| | | | | 381/102 |
| 2017/0194013 | A1 | 7/2017 | Onoda | |

FOREIGN PATENT DOCUMENTS

| | | |
|---|---|---|
| JP | 2017-122792 | 7/2017 |
| JP | 2018-107752 | 7/2018 |
| JP | 2018-155976 | 10/2018 |
| WO | 2018/123730 | 7/2018 |
| WO | 2018/173426 | 9/2018 |

* cited by examiner

*Primary Examiner* — Daniel R Sellers
(74) *Attorney, Agent, or Firm* — Rankin, Hill & Clark LLP

(57) ABSTRACT

A circuit device (100) includes a PWM signal output circuit (110) that outputs a PWM signal (SPWM) to a sound outputter (10), and a processing circuit (120) that controls the PWM signal output circuit (110). The frequency band that the sound outputter (10) can output is denoted as an outputtable band, and the frequency band lower than a lower limit of the outputtable band is denoted as a non-output low frequency band. The PWM signal output circuit (110) outputs a PWM signal (SPWM) based on pseudo sound data in which overtones, of a plurality of overtones of a fundamental tone belonging to the non-output low frequency band, that belong to the outputtable band are used.

16 Claims, 9 Drawing Sheets

| data(d) | data(b) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| -7 | 1001 | 1 | 0 | 0 | 0 | 0 | 0 | 0 | 0 | 0 | 0 | 0 | 0 | 0 | 0 | 0 | 0 |
| -6 | 1010 | 1 | 1 | 0 | 0 | 0 | 0 | 0 | 0 | 0 | 0 | 0 | 0 | 0 | 0 | 0 | 0 |
| -5 | 1011 | 1 | 1 | 1 | 0 | 0 | 0 | 0 | 0 | 0 | 0 | 0 | 0 | 0 | 0 | 0 | 0 |
| -4 | 1100 | 1 | 1 | 1 | 1 | 0 | 0 | 0 | 0 | 0 | 0 | 0 | 0 | 0 | 0 | 0 | 0 |
| -3 | 1101 | 1 | 1 | 1 | 1 | 1 | 0 | 0 | 0 | 0 | 0 | 0 | 0 | 0 | 0 | 0 | 0 |
| -2 | 1110 | 1 | 1 | 1 | 1 | 1 | 1 | 0 | 0 | 0 | 0 | 0 | 0 | 0 | 0 | 0 | 0 |
| -1 | 1111 | 1 | 1 | 1 | 1 | 1 | 1 | 1 | 0 | 0 | 0 | 0 | 0 | 0 | 0 | 0 | 0 |
| 0 | 0000 | 1 | 1 | 1 | 1 | 1 | 1 | 1 | 1 | 0 | 0 | 0 | 0 | 0 | 0 | 0 | 0 |
| 1 | 0001 | 1 | 1 | 1 | 1 | 1 | 1 | 1 | 1 | 1 | 0 | 0 | 0 | 0 | 0 | 0 | 0 |
| 2 | 0010 | 1 | 1 | 1 | 1 | 1 | 1 | 1 | 1 | 1 | 1 | 0 | 0 | 0 | 0 | 0 | 0 |
| 3 | 0011 | 1 | 1 | 1 | 1 | 1 | 1 | 1 | 1 | 1 | 1 | 1 | 0 | 0 | 0 | 0 | 0 |
| 4 | 0100 | 1 | 1 | 1 | 1 | 1 | 1 | 1 | 1 | 1 | 1 | 1 | 1 | 0 | 0 | 0 | 0 |
| 5 | 0101 | 1 | 1 | 1 | 1 | 1 | 1 | 1 | 1 | 1 | 1 | 1 | 1 | 1 | 0 | 0 | 0 |
| 6 | 0110 | 1 | 1 | 1 | 1 | 1 | 1 | 1 | 1 | 1 | 1 | 1 | 1 | 1 | 1 | 0 | 0 |
| 7 | 0111 | 1 | 1 | 1 | 1 | 1 | 1 | 1 | 1 | 1 | 1 | 1 | 1 | 1 | 1 | 1 | 1 |

FIG. 9

CIRCUIT DEVICE, SOUND REPRODUCTION DEVICE, AND ELECTRONIC APPARATUS

The present application is based on, and claims priority from JP Application Serial Number 2019-195975, filed Oct. 29, 2019, the disclosure of which is hereby incorporated by reference herein in its entirety.

BACKGROUND

1. Technical Field

The present disclosure relates to a circuit device, a sound reproduction device, an electronic apparatus, and the like.

2. Related Art

Voice reproduction devices are known in which voice is reproduced from a speaker or the like by driving the speaker or the like based on voice data. JP-A-2018-155976 discloses a voice reproduction device in which voice data is converted to a PWM signal by middleware stored in a memory as a result of the middleware being executed by a CPU, and an H bridge circuit drives a speaker based on the PWM signal. Also, JP-A-2017-122792 discloses a method with which, as a result of generating an overtone signal based on voice data, and performing band extension using the overtone signal, high quality voice information can be obtained and also the computation load of a CPU or the like can be reduced.

In JP-A-2017-122792 described above, the band extension is performed using an overtone signal, but the frequency characteristics of a voice outputter such as a speaker is not taken into consideration, and therefore there is a risk that a high quality voice may not be reproduced. For example, when the frequency band that can be reproduced by a voice outputter is narrow, when the frequency band mainly included in voice data does not match the frequency band that the voice outputter can reproduce, or the like, there is a risk that a high quality voice may not be reproduced.

SUMMARY

One aspect of this disclosure relates to a circuit device including: a PWM signal output circuit configured to output a PWM signal to a sound outputter; and a processing circuit configured to control the PWM signal output circuit, wherein, when a frequency band that the sound outputter can output is denoted as an outputtable band, and a frequency band lower than a lower limit of the outputtable band is denoted as a non-output low frequency band, the PWM signal output circuit outputs a PWM signal based on pseudo sound data in which overtones, of a plurality of overtones of a fundamental tone belonging to the non-output low frequency band, that belong to the outputtable band are used.

BRIEF DESCRIPTION OF THE DRAWINGS

The disclosure will be described with reference to the accompanying drawings, wherein like numbers reference like elements.

FIG. 9 is a diagram illustrating the operations of a PWM conversion circuit.

DESCRIPTION OF EXEMPLARY EMBODIMENTS

Hereinafter, preferred embodiments of the disclosure will be described in detail. Note that the embodiments given below are not intended to unduly limit the scope of the disclosure recited in the appended claims. In addition, not all of the constituent elements described below are essential to the disclosure.

1. Circuit Device and Sound Reproduction Device

Figure 1:
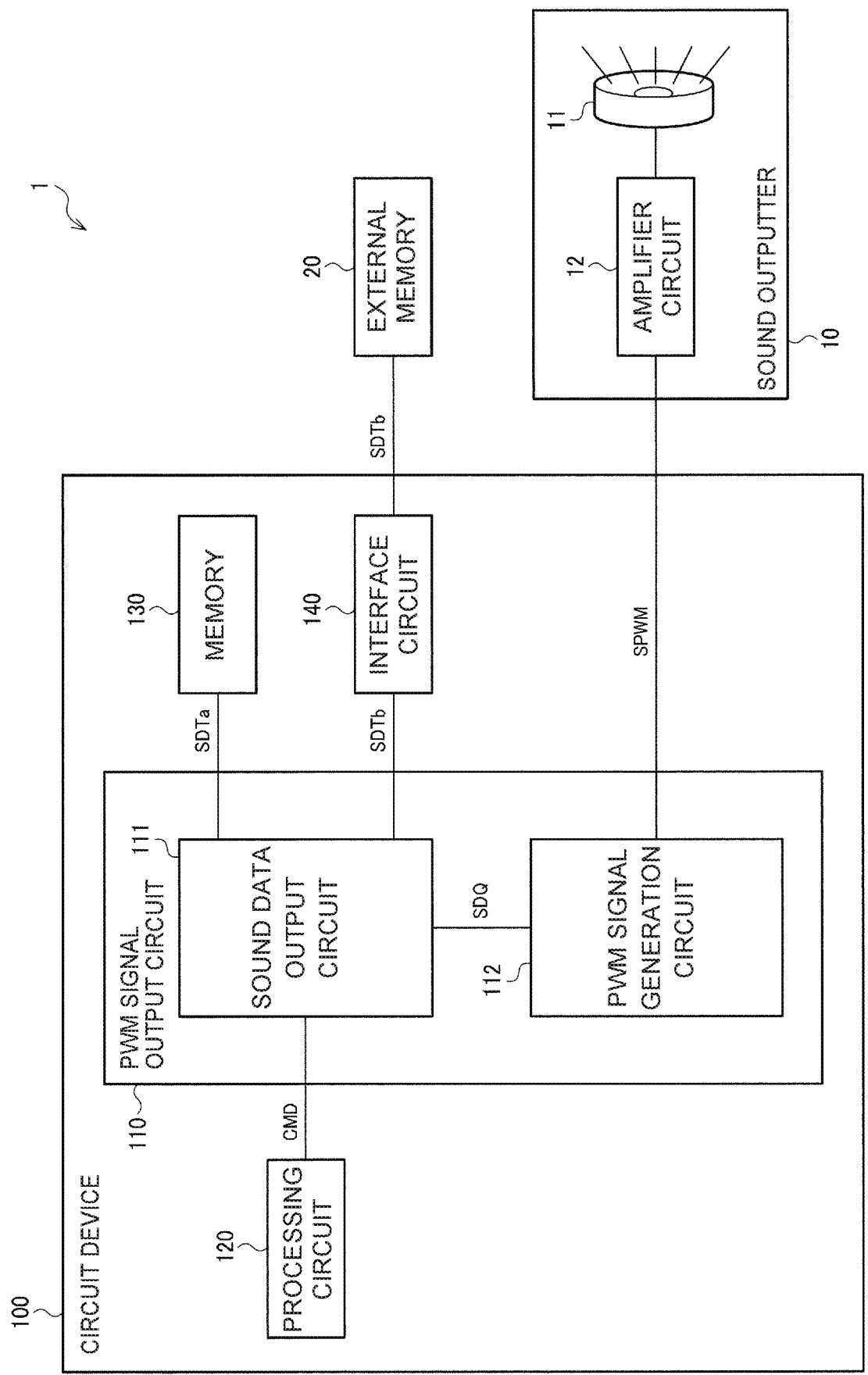
FIG. 1 is an exemplary configuration of a circuit device and a sound reproduction device 1.

FIG. 1 is an exemplary configuration of a circuit device 100 and a sound reproduction device 1. The sound reproduction device 1 includes a sound outputter 10, the circuit device 100, and an external memory 20. The circuit device 100 includes a PWM signal output circuit 110, a processing circuit 120, a memory 130, and an interface circuit 140. Note that the present embodiment is not limited to the configuration in FIG. 1, and various modifications can be implemented such as omitting some of the constituent elements or adding other constituent elements. For example, when the external memory 20 is not used, the circuit device 100 may not include the interface circuit 140.

The circuit device 100 is an integrated circuit device that is called an IC (Integrated Circuit). For example, the circuit device 100 is an IC manufactured by a semiconductor process, and is a semiconductor chip in which circuit elements are formed on a semiconductor substrate. A processor such as a microcomputer or a CPU (Central Processing Unit) can be envisioned as the circuit device 100, but the application target of the circuit device 100 is not limited to the processor.

The sound outputter 10 outputs sound based on a PWM signal SPWM from the circuit device 100. The sound is voice or sound other than the voice. The voice is sound uttered by human beings. Note that, in the following, a case where the sound is voice will be mainly described. The sound outputter 10 includes a sound output device 11 and an amplifier circuit 12.

The sound output device 11 is a device that converts an electrical signal to sound. A speaker or a buzzer that outputs sound by causing a vibrating plate to vibrate by magnetism generated by the electrical signal, a speaker or a buzzer that outputs sound by causing a piezoelectric element to vibrate by the electrical signal, or the like is envisioned as the sound output device 11. A small-sized speaker that cannot output a portion or the entirety of the voice band is envisioned as the speaker. The buzzer is a device in which outputting an alarm sound and the like is envisioned instead of outputting voice, but in the present embodiment, a buzzer may also be used for outputting voice. The buzzer has a feature that the peak in the frequency characteristics is positioned higher than the voice band, and the reproducible band is narrower, relative to a speaker for outputting voice.

The amplifier circuit 12 amplifies the PWM signal SPWM, and drives the sound output device 11 by the amplified signal. The amplifier circuit 12 is an H bridge circuit. The H bridge circuit includes a first transistor connected between a power supply and a positive electrode of the sound output device 11, a second transistor connected between ground and a negative electrode of the sound output device 11, a third transistor connected between the power supply and the negative electrode of the sound output device 11, and a forth transistor connected between ground and the positive electrode of the sound output device 11. When the PWM signal SPWM is at a high level, the first and second transistors are in an ON state, and the third and fourth transistors are in an OFF state. When the PWM signal SPWM is at a low level, the first and second transistors are in an OFF state, and the third and fourth transistors are in an ON state. Note that the amplifier circuit 12 is provided outside the circuit device 100 in FIG. 1, but the amplifier circuit 12 may be incorporated in the circuit device 100.

The processing circuit 120 controls the PWM signal output circuit 110. Specifically, the processing circuit 120 issues a command CMD for instructing the PWM signal output circuit 110 to perform sound reproduction. The PWM signal output circuit 110, upon receiving the command CMD, outputs the PWM signal SPWM to the sound outputter 10. With this, sound is reproduced from the sound outputter 10. The processing circuit 120 is a logic circuit. For example, when the circuit device 100 is the processor described above, the processing circuit 120 corresponds to a CPU core.

Figure 2:
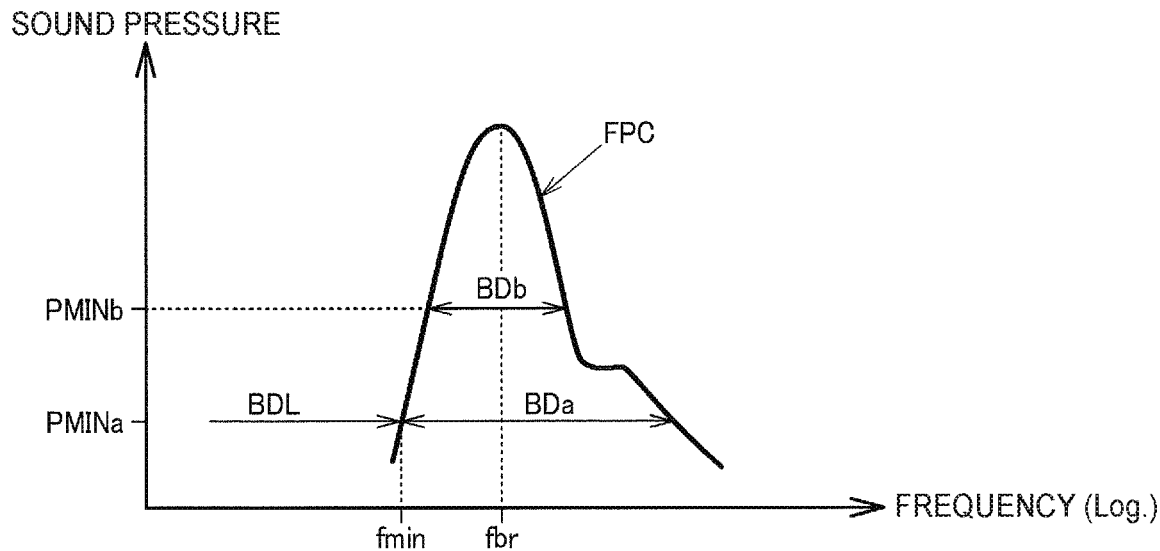
FIG. 2 is a diagram illustrating operations of the circuit device.
Figure 3:
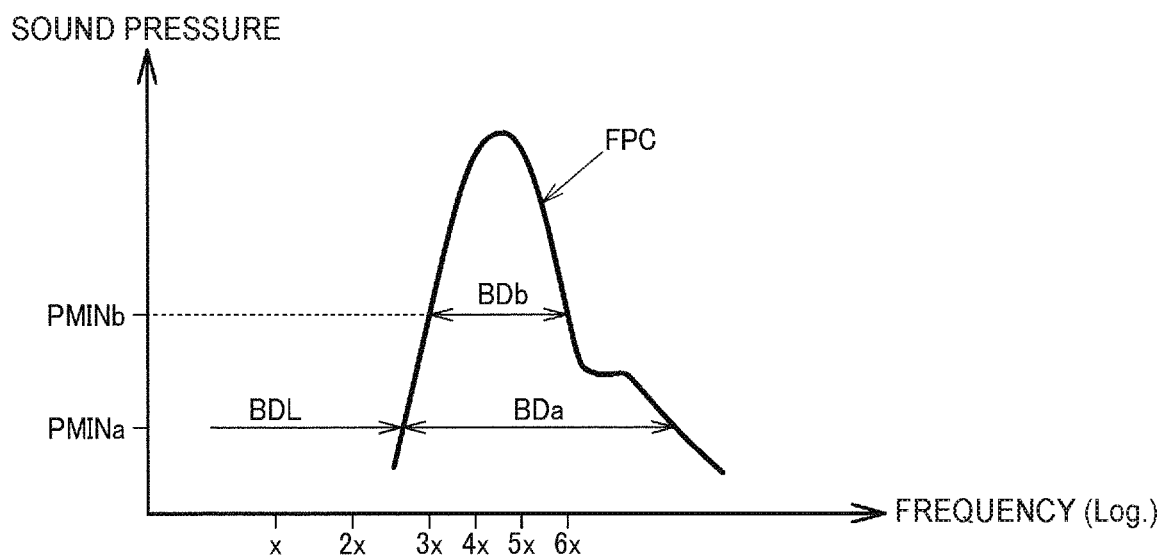
FIG. 3 is a diagram illustrating operations of the circuit device.

FIGS. 2 and 3 are diagrams illustrating operations of the circuit device 100. The PWM signal output circuit 110 outputs the PWM signal SPWM based on pseudo sound data. In the pseudo sound data, overtones, of a plurality of overtones $2x$, $3x$, ... of a fundamental tone x belonging to a non-output low frequency band BDL, that belong to an outputtable band BDa are used.

The outputtable band BDa is a frequency band that the sound outputter 10 can output. Here, the "outputtable" means being able to output sound having a sound pressure at a predetermined sound pressure PMINa or more that is audible to human beings. Specifically, the outputtable band BDa is a frequency band that the sound output device 11 can output, in the frequency characteristics FPC of the sound output device 11. For example, the outputtable band BDa is a frequency band in which a large sound pressure at the predetermined sound pressure PMINa or more that is audible to human beings can be obtained, in the frequency characteristics FPC. The non-output low frequency band BDL is a frequency band lower than a lower limit f min of the outputtable band BDa. That is, the non-output low frequency band BDL is a band on a low frequency side of the frequency bands in which the sound pressure is at the sound pressure PMINa or less, in the frequency characteristics FPC.

An overtone is sound having a frequency that is n times the frequency of a fundamental tone x. n is an integer of two or more. n is referred to as a multiple, and an overtone having a frequency that is n times the frequency of a fundamental tone x is referred to as an nth overtone. In FIG. 3, overtones of the third overtone and more are included in the outputtable band BDa. Note that the fundamental tone x has any frequency included in the non-output low frequency band BDL, and therefore the overtone at the lowest order included in the outputtable band BDa changes depending on the frequency of the fundamental tone x. That is, as the frequency of the fundamental tone x decreases, the multiple of the lowest order overtone included in the outputtable band BDa increases.

According to the present embodiment, the PWM signal output circuit 110 outputs the PWM signal SPWM based on the pseudo sound data in which overtones belonging to the outputtable band BDa are used. With this, the sound output from the sound outputter 10 becomes a sound that is perceived as the fundamental tone x belonging to the non-output low frequency band BDL being output. That is, the sound in a band that the sound output device 11 cannot originally output is output in a pseudo manner by using overtones, and therefore a high quality voice can be reproduced. For example, even in a case where the sound output device 11 is a small-sized speaker that cannot output a portion or the entirety of the voice band, or a buzzer in which a voice output is not envisioned, the voice can be reproduced in a pseudo manner by utilizing the pseudo sound data in which overtone components of the voice is used.

More specifically, the PWM signal output circuit 110 outputs the PWM signal SPWM based on the pseudo sound data in which overtones belonging to a predetermined band BDb, of a plurality of overtones $2x$, $3x$, ..., are used. The predetermined band BDb is a frequency band, inside the outputtable band BDa, that includes a highest sound pressure peak in the frequency characteristics FPC of the sound outputter 10. As shown in FIG. 2, the frequency for at which the sound pressure is at the maximum in the frequency characteristics FPC is the frequency of the sound pressure peak. The lower limit of the predetermined band BDb is higher than the lower limit of the outputtable band BDa, and the upper limit of the predetermined band BDb is lower than the upper limit of the outputtable band BDa. For example, the predetermined band BDb is a frequency band in which the sound pressure is greater than or equal to a predetermined sound pressure PMINb that is larger than the sound pressure PMINa, in the frequency characteristics FPC. That is, setting the predetermined band BDb means setting a frequency band in which the sound pressure is at a predetermined magnitude or more in order to efficiently select overtones whose sound pressures are high as much as possible. Therefore, any sound pressure PMINb that is larger than the sound pressure PMINa is meaningful for setting the predetermined band BDb.

The predetermined band BDb is a band, in the vicinity of a sound pressure peak, in which the sound pressure is relatively high, in the outputtable band BDa. In the present embodiment, the PWM signal output circuit 110 outputs the PWM signal SPWM based on the pseudo sound data in which overtones belonging to the predetermined band BDb are used. With this, sound can be reproduced in a pseudo manner using a frequency band in which the output characteristics of the sound outputter 10 is preferable, and therefore a high quality sound can be reproduced.

When the reproduction target is voice, the lower limit f min of the outputtable band BDa is 500 Hz or more, and the lower limit of the predetermined band BDb is 1 kHz or more.

The voice includes many frequency components of 1 kHz or less, and therefore, if a small-sized speaker or a buzzer is used that cannot reproduce the entirety or a portion of the band of 1 kHz or less, a low quality voice is reproduced when normal voice data is merely reproduced as is. The low quality is quality of voice that is not audible to human being. In the present embodiment, even in a case where a small-sized speaker or a buzzer is used in which the lower limit f min of the outputtable band BDa is 500 Hz or more or the lower limit of the predetermined band BDb including the sound pressure peak is 1 kHz or more, a high quality voice can be reproduced by using overtones included in the predetermined band BDb.

In the present embodiment, the pseudo sound data is voice data subjected to high pass filtering processing or band pass filtering processing such that the sound in the predetermined band BDb is allowed to pass.

According to the present embodiment, as a result of performing high pass filtering processing or band pass filtering processing such that the sound in the predetermined band BDb is allowed to pass, overtones included in the predetermined band BDb can be extracted. With this, the pseudo sound data in which the overtones belonging to the predetermined band BDb are used is generated. Note that the details of the pseudo sound data generation method will be described later.

Note that the upper limit of the predetermined band BDb is lower than the upper limit of the outputtable band BDa, in FIGS. 2 and 3, but there is no limitation thereto, and the upper limit of the predetermined band BDb may be higher than the upper limit of the outputtable band BDa. For example, when the pseudo sound data is created using high pass filtering processing, the upper limit of the predetermined band BDb may be unlimited.

In the present embodiment, the processing circuit 120 issues the command CMD for instructing outputting of the PWM signal SPWM. The PWM signal output circuit 110, upon receiving the command CMD from the processing circuit 120, creates the PWM signal SPWM from the pseudo sound data, and outputs the created PWM signal SPWM to the sound outputter 10.

According to the present embodiment, as a result of the processing circuit 120 merely issuing the command CMD, the PWM signal output circuit 110 generates the PWM signal SPWM from the pseudo sound data. That is, the PWM signal output circuit 110 is a hardware circuit that is provided separately from the processing circuit 120, and the hardware circuit takes the processing load for generating the PWM signal SPWM. With this, the sound reproduction can be realized without increasing the load of the processing circuit 120. For example, a processor mounted on an electronic apparatus can be envisioned as the circuit device 100. In this case, the processor needs to perform the control processing of the electronic apparatus. In the present embodiment, the resource of the CPU core can be assigned to the control processing when sound reproduction is performed as well.

Note that the PWM signal output circuit 110 has been described above as a hardware circuit, but the functions of the PWM signal output circuit 110 may be realized by software processing. That is, the functions of the PWM signal output circuit 110 may also be realized by storing a program in which the functions of the PWM signal output circuit 110 are described in an unshown memory, and the processing circuit 120 executing the program. In this case as well, as a result of generating the PWM signal SPWM from the pseudo sound data in which overtones are used, a high quality voice can be reproduced.

A detailed exemplary configuration of the PWM signal output circuit 110 will be described using FIG. 1. As shown in FIG. 1, the PWM signal output circuit 110 includes a sound data output circuit 111 and a PWM signal generation circuit 112.

The sound data output circuit 111 outputs output sound data SDQ based on the pseudo sound data. The sound data output circuit 111 may output, as the output sound data SDQ, data obtained by subjecting the pseudo sound data to some processing, or output the pseudo sound data as is. For example, when the pseudo sound data is compressed data, the sound data output circuit 111 outputs data obtained by decompressing the pseudo sound data, as the output sound data SDQ.

Specifically, the memory 130 incorporated in the circuit device 100 stores the pseudo sound data SDTa. The memory 130 is a nonvolatile memory or a semiconductor memory such as a RAM. When the memory 130 is a nonvolatile memory, the pseudo sound data SDTa may be written into the memory 130 in advance. The sound data output circuit 111 reads out the pseudo sound data SDTa stored in the memory 130, and outputs the output sound data SDQ based on the pseudo sound data SDTa.

Alternatively, the external memory 20 provided outside the circuit device 100 stores the pseudo sound data SDTb. The external memory 20 is a nonvolatile memory or a semiconductor memory such as a RAM. When the external memory 20 is a nonvolatile memory, the pseudo sound data SDTb may be written into the external memory 20 in advance. The interface circuit 140 receives the pseudo sound data SDTb from the external memory 20. For example, the interface circuit 140 transmits a readout command to the external memory 20, and the external memory 20 reads out the pseudo sound data SDTb in response to the readout command, and transmits the pseudo sound data SDTb to the interface circuit 140. The sound data output circuit 111 outputs the output sound data SDQ based on the pseudo sound data SDTb received by the interface circuit 140.

The PWM signal generation circuit 112 generates the PWM signal SPWM based on the output sound data SDQ, and outputs the generated PWM signal SPWM to the sound outputter 10. Specifically, the PWM signal generation circuit 112 converts the output sound data SDQ to the PWM signal SPWM using a predetermined conversion rule. An example of the conversion rule will be described later. The output sound data SDQ is time series data obtained by sampling a sound waveform. The PWM signal generation circuit 112 converts each piece of sampling data to a PWM signal having a pulse width corresponding to the value of the sampling data.

The reproduction processing described above is executed triggered by the command CMD issued by the processing circuit 120. That is, the sound data output circuit 111, upon receiving the command CMD, reads out the pseudo sound data from the memory 130 or the external memory 20, and outputs the output sound data SDQ to the PWM signal generation circuit 112 based on the pseudo sound data. The PWM signal generation circuit 112, upon receiving the output sound data SDQ, outputs the PWM signal SPWM to the sound outputter 10. In this way, as a result of the processing circuit 120 issuing the command CMD, sound is reproduced from the sound outputter 10 based on the pseudo sound data.

2. Generation Method of Pseudo Sound Data

Figure 4:
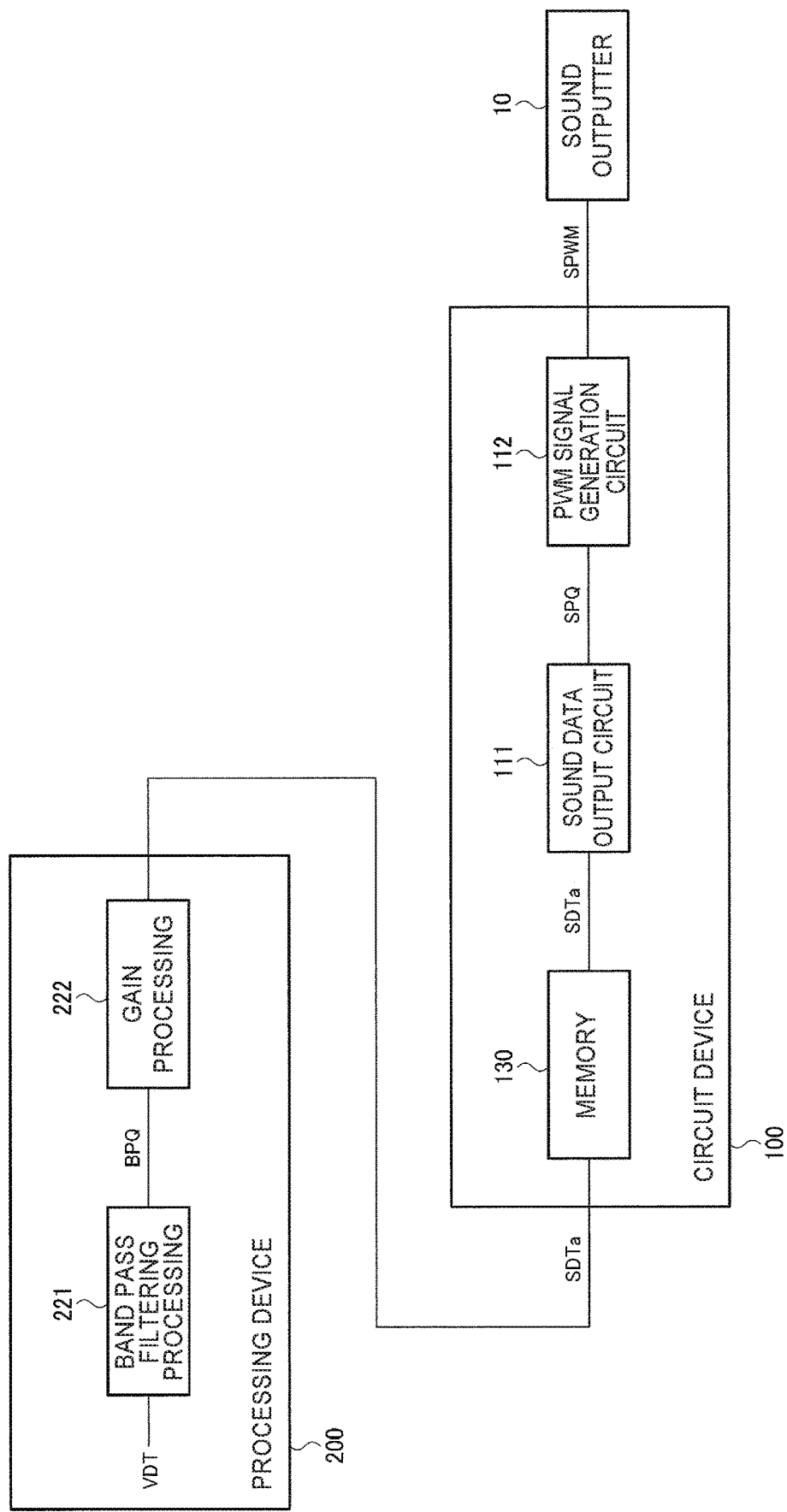
FIG. 4 is a diagram illustrating a first generation method of pseudo sound data.

FIG. 4 is a diagram illustrating a first generation method of the pseudo sound data. Note that, in FIG. 4, only the blocks relating to generation of the pseudo sound data in the circuit device 100 are illustrated, and the illustration of the other blocks are omitted.

In the first generation method, a processing device 200, which is a device outside the circuit device 100, generates the pseudo sound data. The processing device 200 is an information processing device such as a PC (Personal Computer) or a server.

The processing device 200 extracts components of the predetermined band BDb from sound data VDT, and generates the pseudo sound data SDTa by emphasizing the components of the predetermined band BDb. The sound data VDT is the original sound data in which the components of the predetermined band BDb are not emphasized. For example, the sound data VDT is voice data obtained, by recording, for a speaker for normal voice reproduction.

Figure 5:
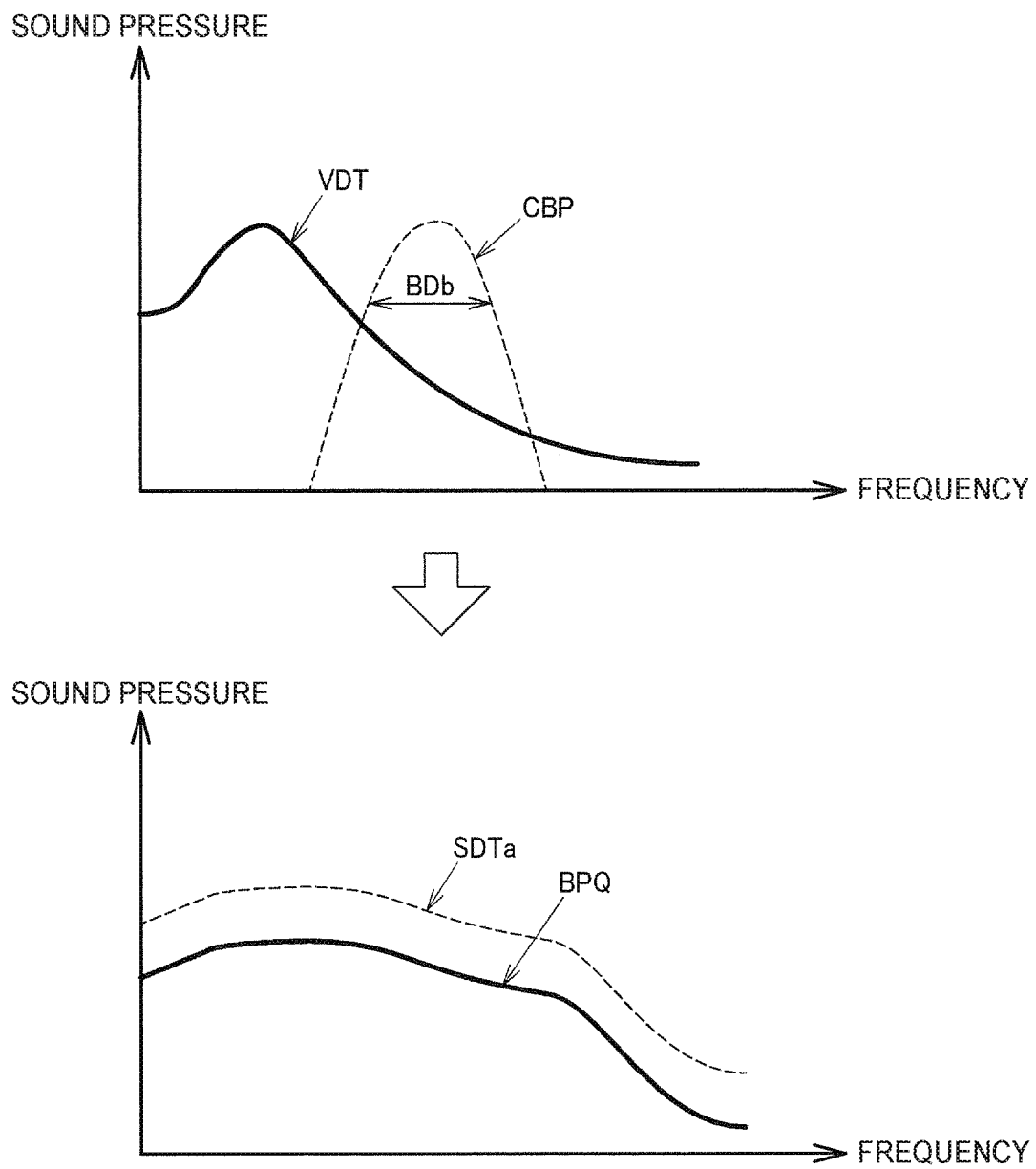
FIG. 5 is a diagram illustrating operations of a processing device.

FIG. 5 is a diagram illustrating operations of the processing device 200. The sound data VDT has a sound pressure peak on a low frequency side relative to the predetermined band BDb. That is, the sound data VDT that is not normally appropriate for reproduction by the sound outputter 10 is assumed.

As shown in FIG. 4, the processing device 200 performs band pass filtering processing 221 on the sound data VDT, and performs gain processing 222 on the resultant sound data BPQ. The processing device 200 outputs the result of the gain processing 222 as pseudo sound data SDTa. As shown in FIG. 5, the band pass filtering processing 221 has frequency characteristics CBP in which the predetermined band BDb is the pass band. Note that the processing device 200 may also output the sound data BPQ by performing high pass filtering processing on the sound data VDT. In this case as well, the pass band of the high pass filtering processing is the predetermined band BDb. That is, the cutoff frequency of the high pass filtering processing is at the lower limit of the predetermined band BDb.

The gain processing 222 is for generating the pseudo sound data SDTa by applying gain to the sound pressure of the sound data BPQ. For example, the gain is fixed regardless of the frequency. The gain may also be variably settable. Also, the gain need only be a real number multiple larger than 0. The generated pseudo sound data SDTa is stored in the memory 130 of the circuit device 100.

As shown in FIG. 5, the frequency characteristics of the sound data BPQ become characteristics such that the components inside the predetermined band BDb of the sound data VDT are enhanced and the components outside the predetermined band BDb are attenuated. That is, the sound data BPQ has frequency characteristics such that the band is expanded toward the high frequency side relative to the frequency characteristics that the normal voice data has. The pseudo sound data SDTa similarly has frequency characteristics such that the band is expanded toward the high frequency side relative to the frequency characteristics that the normal voice data has.

Note that a case where the pseudo sound data generated by the processing device 200 is stored in the memory 130 has been described above as an example, but the pseudo sound data generated by the processing device 200 may also be stored in the external memory 20. The pseudo sound data in this case corresponds to SDTb in FIG. 1.

Also, a case where the processing circuit 120, which is a device outside the circuit device 100, generates the pseudo sound data has been described above as an example, but the circuit device 100 may also internally generate the pseudo sound data. This method is a second generation method of the pseudo sound data.

Figure 6:
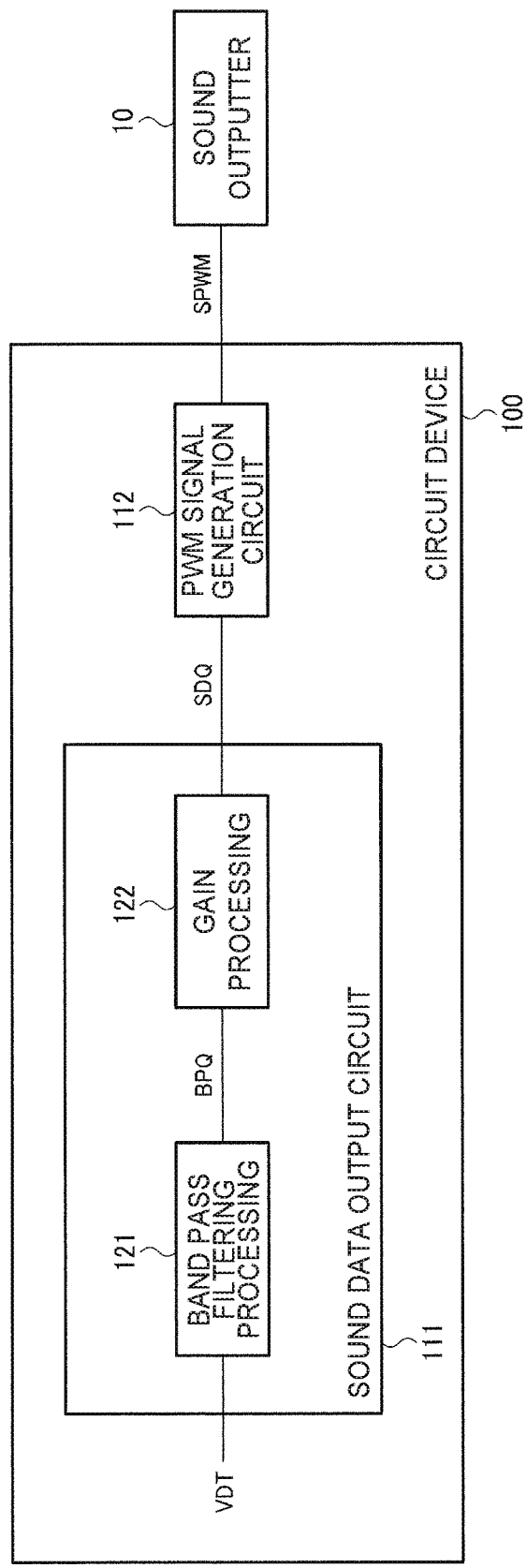
FIG. 6 is a diagram illustrating a second generation method of the pseudo sound data.

FIG. 6 is a diagram illustrating the second generation method of the pseudo sound data. In the second generation method, the sound data VDT is stored in the memory 130 or the external memory 20 in FIG. 1, and the sound data output circuit 111 generates the pseudo sound data based on the sound data VDT stored in the memory 130 or the external memory 20.

As shown in FIG. 6, the sound data output circuit 111 performs band pass filtering processing 121 on the sound data VDT, and performs gain processing 122 on the resultant sound data BPQ. The band pass filtering processing 121 may also be high pass filtering processing. The sound data output circuit 111 outputs the pseudo sound data, which is the result of the gain processing 122, as the output sound data SDQ. Note that the band pass filtering processing 121, high pass filtering processing, and gain processing 122 are similar to the band pass filtering processing 221, high pass filtering processing, and gain processing 222 described in FIG. 4.

When the sound data stored in the memory 130 or the external memory 20 is compressed data, the sound data output circuit 111 acquires the sound data VDT by decompressing the compressed data, and inputs the sound data VDT to the band pass filtering processing 121.

3. Sound Data Output Circuit and PWM Signal Generation Circuit

Figure 7:
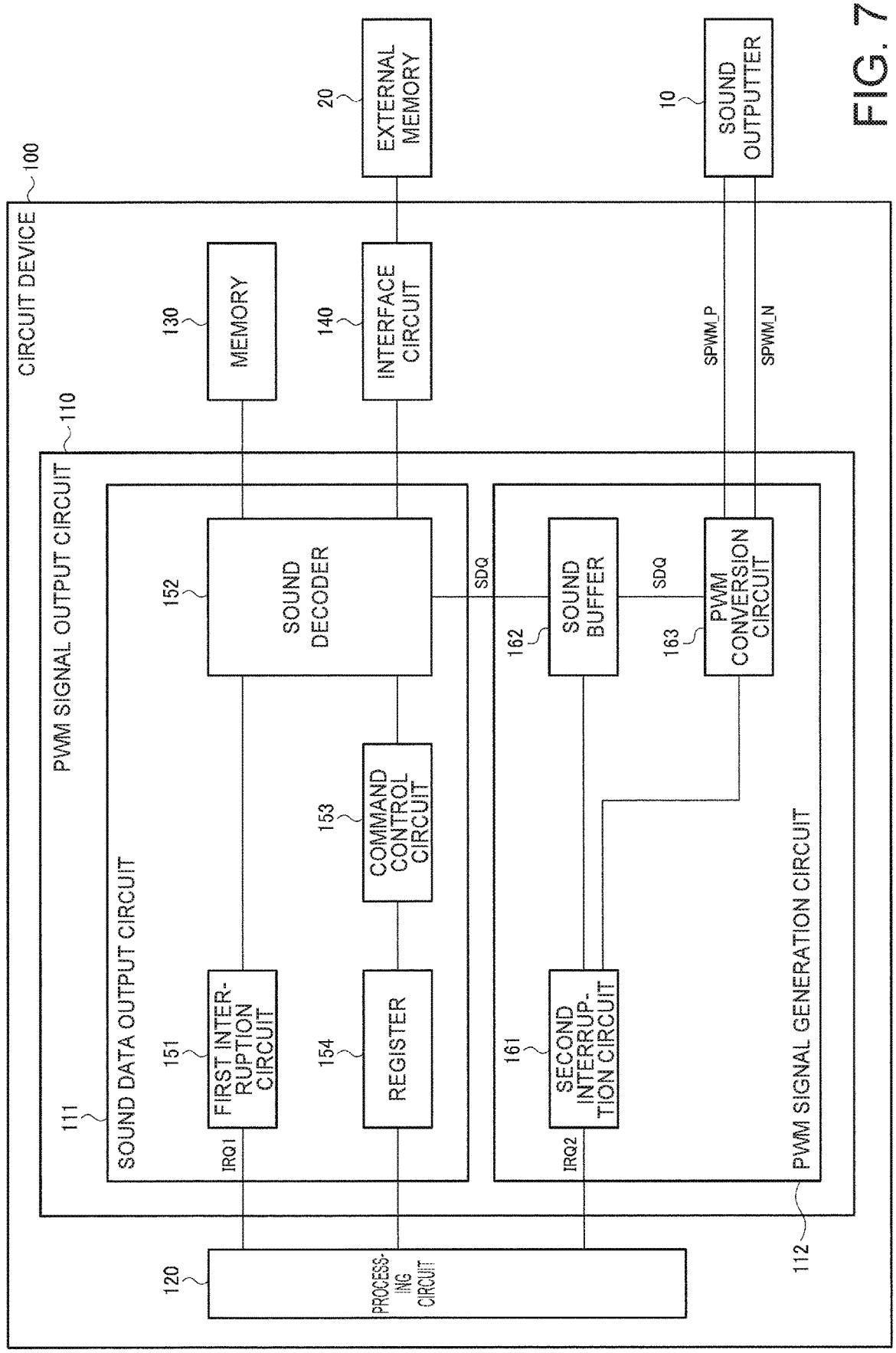
FIG. 7 is a detailed exemplary configuration of a sound data output circuit and a PWM signal generation circuit.

FIG. 7 is a detailed exemplary configuration of the sound data output circuit 111 and the PWM signal generation circuit 112. The sound data output circuit 111 includes a sound decoder 152, a command control circuit 153, a first interruption circuit 151, and a register 154. The PWM signal generation circuit 112 includes a sound buffer 162, a PWM conversion circuit 163, and a second interruption circuit 161.

The sound data output circuit 111 performs decode processing on the pseudo sound data, and outputs the result as the output sound data SDQ. An example of the decode processing is processing in which the format of the pseudo sound data input from the memory 130 or the external memory 20 is converted to a format that the PWM conversion circuit 163 can accept. Alternatively, another example of the decode processing is processing for, when compressed pseudo sound data is stored in the memory 130 or the external memory 20, decompressing the compressed data. Note that when the sound data output circuit 111 generates the pseudo sound data, as shown in FIG. 6, the sound decoder 152 executes the band pass filtering processing 121 and the gain processing 122.

The processing circuit 120 writes a command for controlling the state of the sound decoder 152 to the register 154. That is, the processing circuit 120 issues a command by writing a register value corresponding to the command to the register. The command control circuit 153 controls the state of the sound decoder 152 based on the command written into the register 154.

Figure 8:
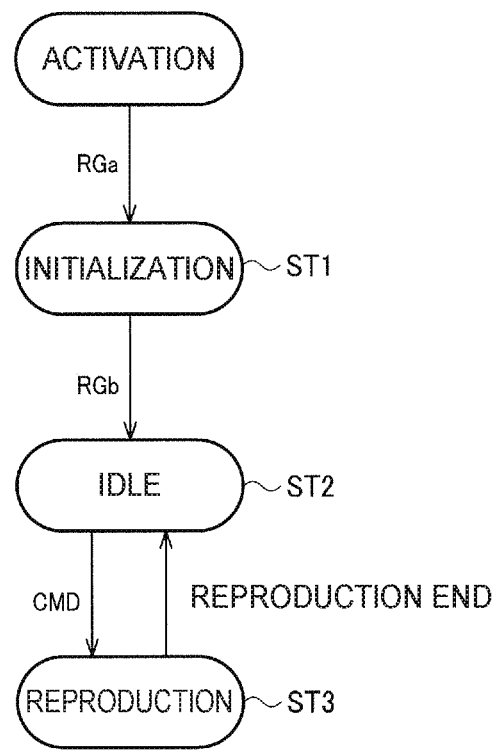
FIG. 8 is a state transition diagram of a sound decoder.

FIG. 8 is a state transition diagram of the sound decoder 152. When the processing circuit 120 issues, after the circuit device 100 is activated, an initialization command RGa, the sound decoder 152 transitions to an initialized state ST1. In the initialized state ST1, the sound decoder 152 performs initialization processing such as operation setting.

In the initialized state ST1, when the processing circuit 120 issues an idle command RGb, the sound decoder 152 transitions to an idle state ST2. The idle state ST2 is a stand-by state in which the sound decoder 152 waits for a reproduction command from the processing circuit 120.

In the idle state ST2, when the processing circuit 120 issues the reproduction command CMD, the sound decoder 152 transitions to a reproduction state ST3. In the reproduction state ST3, the sound decoder 152 outputs the output sound data SDQ by performing decode processing on the pseudo sound data.

When the reproduction is ended, the sound decoder 152 transitions to the idle state ST2. Alternatively, in the reproduction state ST3, when the processing circuit 120 issues a reproduction stop command, the sound decoder 152 transitions to the idle state ST2.

As shown in FIG. 7, the first interruption circuit 151 outputs a first interruption signal IRQ1 to the processing circuit 120. Specifically, the first interruption circuit 151 outputs the first interruption signal IRQ1 based on the state of data input to the sound decoder 152 or the operating condition of the sound decoder 152.

Various conditions for outputting the first interruption signal IRQ1 are envisioned. For example, the first interruption signal IRQ1 is output when the pseudo sound data is not input from the memory 130 or the external memory 20, or an error is present in the format of the pseudo sound data input from the memory 130 or the external memory 20. Alternatively, the first interruption signal IRQ1 is output when an anomaly occurs in the decode processing, or an anomalous operation of the sound decoder 152 has been detected such as a case where a state transition error has occurred. These are cases where the first interruption signal IRQ1 is output caused by occurrences of errors. When a normal operation is performed, the first interruption signal IRQ1 is output when the sound decoder 152 transitions between specific states, for example. There are four transitions in the example in FIG. 8, and the first interruption signal IRQ1 is output when specific one or more transitions occur, of the four transitions. The transition that causes the first interruption signal IRQ1 to be generated can be arbitrarily selected by register setting or the like.

According to the present embodiment, the processing circuit 120 can know the operating condition of the sound decoder 152 by the first interruption signal IRQ1. That is, when the PWM signal output circuit 110 is constituted by a hardware circuit different from the processing circuit 120, the processing circuit 120 cannot know the operating condition of the sound decoder 152, unless the processing circuit 120 is notified of the operating condition of the sound decoder 152 by some notification means. In the present embodiment, the notification means is the first interruption signal IRQ1.

Next, the PWM signal generation circuit 112 will be described. The sound buffer 162 buffers the output sound data SDQ output from the sound decoder 152. For example, the sound buffer 162 is a register or a memory that temporarily stores the output sound data SDQ.

The PWM conversion circuit 163 converts the output sound data SDQ buffered by the sound buffer 162 to PWM signals SPWM_P and SPWM_N. The PWM signals SPWM_P and SPWM_N are differential signals, and correspond to the PWM signal SPWM in FIG. 1.

Figure 10:
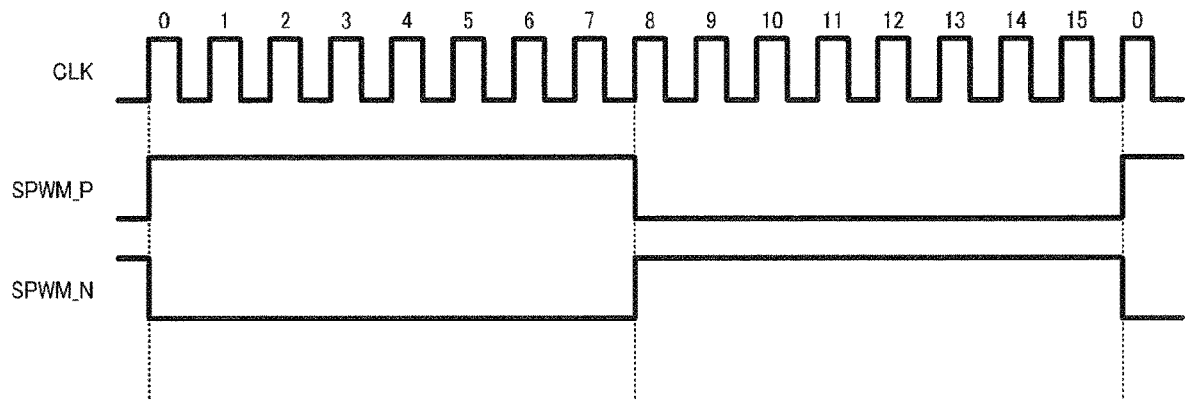
FIG. 10 is a diagram illustrating the operations of the PWM conversion circuit.

FIGS. 9 and 10 are diagrams illustrating operations of the PWM conversion circuit 163. The output sound data SDQ includes time series data corresponding to a sound waveform. Here, it is assumed that each data of the time series data is 4-bit data.

In order to simplify the description, FIG. 9 shows exemplary PWM signal generation when 4-bit data is PWM-converted, for example.

FIG. 10 shows an exemplary waveforms of the 4-bit PWM signal. The clock signal CLK is a clock signal that the PWM conversion circuit 163 uses for generating the PWM signal. 16 cycles of the clock signal CLK corresponds to one cycle of the PWM signal. In FIG. 10, numbers 0 to 15 are sequentially given to respective cycles of the clock signal CLK corresponding to one cycle of the PWM signal. FIG. 10 shows an exemplary waveforms when the 4-bit data is "0000".

As shown in FIG. 7, the second interruption circuit 161 outputs a second interruption signal IRQ2 to the processing circuit 120. Specifically, the second interruption circuit 161 outputs the second interruption signal IRQ2 based on the state of data input to the sound buffer 162, the state of data input to the PWM conversion circuit 163, the operating condition of the sound buffer 162, or the operating condition of the PWM conversion circuit 163.

Various conditions for outputting the second interruption signal IRQ2 are envisioned. For example, the second interruption signal IRQ2 is output when the output sound data SDQ is not input to the sound buffer 162, or an error is present in the format of the output sound data SDQ input to the sound buffer 162. Alternatively, the second interruption signal IRQ2 is output when an anomalous operation is detected in the operations of the sound buffer 162. Alternatively, the second interruption signal IRQ2 is output when the output sound data SDQ is not input to the PWM conversion circuit 163, or an error is present in the format of the output sound data SDQ input to the PWM conversion circuit 163. Alternatively, the second interruption signal IRQ2 is output when an anomalous operation is detected in the operations of the PWM conversion circuit 163.

According to the present embodiment, the processing circuit 120 can know the operating conditions of the sound buffer 162 and the PWM conversion circuit 163 by the second interruption signal IRQ2. That is, when the PWM signal output circuit 110 is constituted by a hardware circuit different from the processing circuit 120, the processing circuit 120 cannot know the operating conditions of the sound buffer 162 and the PWM conversion circuit 163, unless the processing circuit 120 is notified of the operating conditions of the sound buffer 162 and the PWM conversion circuit 163 by some notification means. In the present embodiment, the notification means is the second interruption signal IRQ2.

4. Electronic Apparatus

Figure 11:
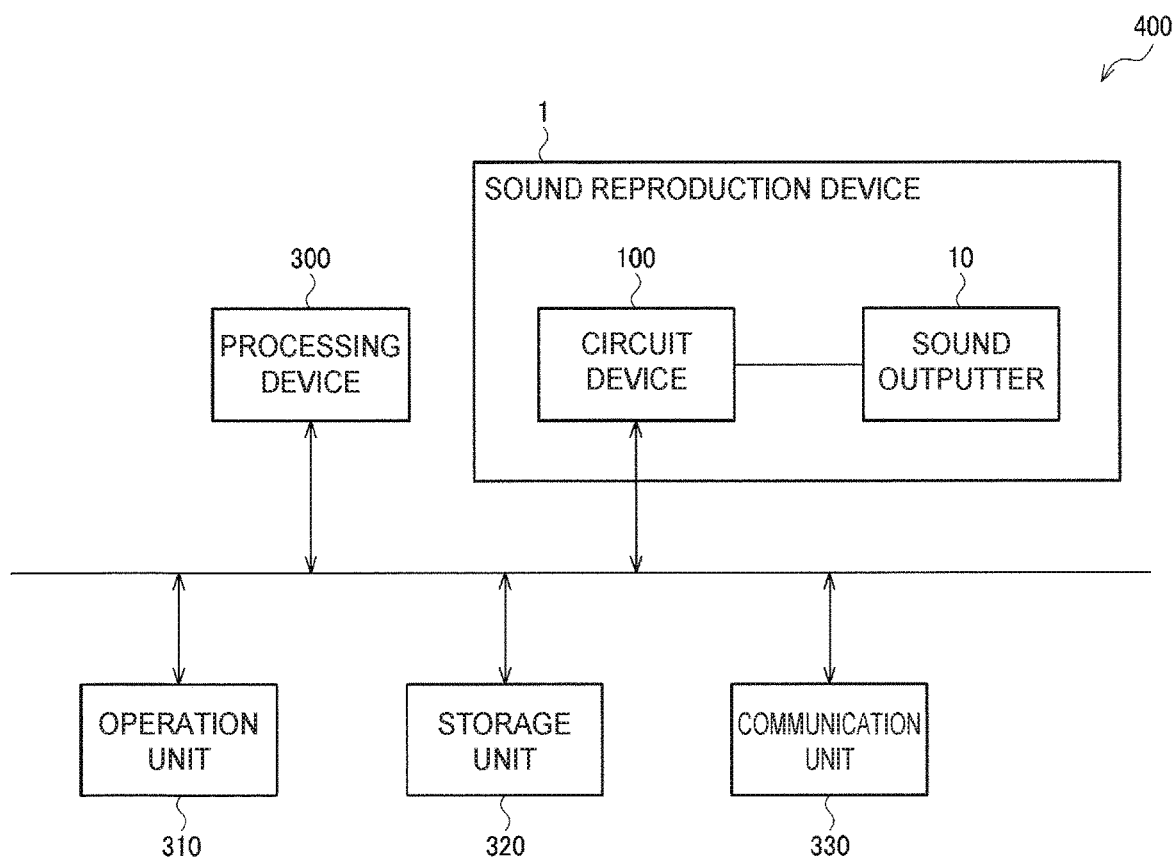
FIG. 11 shows an exemplary configuration of an electronic apparatus.

FIG. 11 shows an exemplary configuration of an electronic apparatus 400 including the circuit device 100. The electronic apparatus 400 includes a sound reproduction device 1, a processing device 300, an operation unit 310, a storage unit 320, and a communication unit 330. The sound reproduction device 1 includes the circuit device 100 and the sound outputter 10. Various electronic apparatuses including a sound output function can be envisioned as the electronic apparatus 400. For example, a home electronic apparatus including a voice guidance function, a reporting device such as a fire alarm, a robot including a voice output function, an on-board apparatus such as a car navigation system, or the like can be envisioned as the electronic apparatus 400.

The communication unit 330 communicate with an external device. The external device is an information processing device such as a PC, for example. The communication unit 330 may be a communication interface conforming to the USB standard, or a network interface such as LAN. The storage unit 320 stores data received from the communication unit 330. Also, the storage unit 320 may also function as a working memory of the processing device 300. The storage unit 320 is one or more of various storage devices such as a semiconductor memory and a hard disk drive. The operation unit 310 is a user interface for the user to operate the electronic apparatus 400. For example, the operation unit 310 is a button, a touch panel, a pointing device, a character input device, or the like. The processing device 300 is a processor such as a CPU or an MPU. The processing device 300 processes data stored in the storage unit 320, controls the units of the electronic apparatus 400, and the like. The circuit device 100 outputs a PWM signal to the sound outputter 10 based on the sound data stored in an internal memory of the circuit device 100 or the storage unit 320. The sound outputter 10 outputs sound based on the PWM signal.

The circuit device of the present embodiment described above includes a PWM signal output circuit that outputs a PWM signal to a sound outputter, and a processing circuit that controls the PWM signal output circuit. The frequency band that the sound outputter can output is denoted as an outputtable band, and the frequency band lower than a lower limit of the outputtable band is denoted as a non-output low frequency band. The PWM signal output circuit outputs a PWM signal based on pseudo sound data in which overtones, of a plurality of overtones of a fundamental tone belonging to the non-output low frequency band, that belong to the outputtable band are used.

Accordingly, sound is output from the sound outputter based on the pseudo sound data in which overtones belonging to the outputtable band of the sound outputter are used. With this, the sound in the non-output low frequency band that the sound outputter cannot originally output can be output in a pseudo manner as a result of using overtones, and therefore a high quality voice can be reproduced.

Also, in the present embodiment, a frequency band that includes a highest sound pressure peak in the frequency characteristics of the sound outputter and is inside the outputtable band may be set as a predetermined band. The PWM signal output circuit may output the PWM signal based on the pseudo sound data in which overtones, of the plurality of overtones, that belong to the predetermined band are used.

Accordingly, sound is output from the sound outputter based on the pseudo sound data in which overtones belonging to a predetermined band, of the outputtable band, in the vicinity of a sound pressure peak, at which the sound pressure is relatively high, are used. With this, sound is reproduced in a pseudo manner using a frequency band in which the output characteristics of the sound outputter are preferable, and there a higher quality sound can be reproduced.

Also, in the present embodiment, the lower limit of the predetermined band may be 1 kHz or more.

Voice includes many frequency components of 1 kHz or less, and therefore a low quality voice is reproduced by merely reproducing normal voice data as is, when a small-sized speaker or a buzzer that cannot reproduce the entirety or a portion of the band of 1 kHz or less. According to the present embodiment, even in a case where a small-sized speaker or a buzzer whose lower limit of the predetermined band including the sound pressure peak is 1 kHz or more, as a result of using overtones in the predetermined band, a high quality voice can be reproduced.

Also, in the present embodiment, the pseudo sound data may be voice data subjected to high pass filtering processing or band pass filtering processing for allowing the predetermined band to pass.

Accordingly, pseudo sound data using overtones, of a plurality of overtones of a fundamental tone belonging to the non-output low frequency band, that belong to the predetermined band is generated.

Also, in the present embodiment, the lower limit of the outputtable band may be 500 Hz or more.

Accordingly, even in a case where a small-sized speaker or a buzzer whose lower limit of the outputtable band is 500 Hz or more is used, as a result of using overtones in the predetermined band, a high quality voice can be reproduced.

Also, in the present embodiment, the processing circuit may issue a command for giving an instruction to output a PWM signal. The PWM signal output circuit, upon accepting the command from the processing circuit, may generate the PWM signal from the pseudo sound data, and output the generated PWM signal.

Accordingly, as a result of the processing circuit merely issuing a command, the PWM signal output circuit generates the PWM signal from the pseudo sound data. With this, the processing load for generating the PWM signal from the pseudo sound data is not imposed on the processing circuit, and therefore the load of the processing circuit can be reduced.

Also, in the present embodiment, the PWM signal output circuit may include a sound data output circuit that outputs output sound data based on the pseudo sound data and a PWM signal generation circuit that generates the PWM signal based on the output sound data.

Accordingly, the output sound data is output based on the pseudo sound data, and the PWM signal is generated based on the output sound data, and as a result, the PWM signal is output based on the pseudo sound data. For example, the sound data output circuit can perform decompression of compressed pseudo sound data, or format conversion of the pseudo sound data.

Also, in the present embodiment, the processing circuit may issue a command for giving an instruction to output the PWM signal. The sound data output circuit, upon accepting the command from the processing circuit, may output the output sound data to the PWM signal generation circuit.

Accordingly, as a result of the processing circuit merely issuing the command, the sound data output circuit outputs the output sound data, and the PWM signal generation circuit generates the PWM signal based on the output sound data. With this, the processing load for generating the PWM signal from the pseudo sound data is not imposed on the processing circuit, and therefore the load of the processing circuit can be reduced.

Also, in the present embodiment, the sound data output circuit may include a sound decoder that outputs the output sound data by performing processing for decoding the pseudo sound data, and a command control circuit that controls the sound decoder based on the command.

Accordingly, the command control circuit, upon accepting the command from the processing circuit, gives an instruction to execute the decode processing to the sound decoder, and the sound data output circuit can execute the decode processing in response to the instruction. With this, the sound data output circuit, upon accepting the command from the processing circuit, can output the output sound data.

Also, in the present embodiment, the circuit device may include a memory for storing the pseudo sound data. The sound data output circuit may output the output sound data based on the pseudo sound data stored in the memory.

Accordingly, pseudo sound data suited to the frequency characteristics of the sound outputter can be prepared in advance, and the pseudo sound data can be stored in the memory. The PWM signal output circuit need only output the PWM signal based on the pseudo sound data prepared in advance. The processing load of the PWM signal output circuit can be reduced compared with the case where the PWM signal output circuit generates the pseudo sound data.

Also, in the present embodiment, the circuit device may include an interface circuit for receiving the sound data from an external memory that stores the pseudo sound data. The sound data output circuit may output the output sound data based on the pseudo sound data received by the interface circuit.

Accordingly, pseudo sound data suited to the frequency characteristics of the sound outputter can be prepared in advance, and the pseudo sound data can be stored in the external memory. The PWM signal output circuit need only output the PWM signal based on the pseudo sound data prepared in advance. The processing load of the PWM signal output circuit can be reduced compared with the case where the PWM signal output circuit generates the pseudo sound data.

Also, in the present embodiment, the sound data output circuit may include a first interruption circuit that outputs a first interruption signal to the processing circuit.

When the PWM signal output circuit is constituted by a hardware circuit different from the processing circuit, the processing circuit cannot know the operating condition of the sound data output circuit, unless the processing circuit is notified of the operating condition of the sound data output circuit by some notification means. According to the present embodiment, the processing circuit can know the operating condition of the sound data output circuit by the first interruption signal.

Also, in the present embodiment, the PWM signal generation circuit may include a sound buffer that buffers the output sound data, and a PWM conversion circuit that converts the output sound data buffered by the sound buffer to the PWM signal.

Accordingly, the output sound data is buffered, and the buffered output sound data is converted to the PWM signal, and as a result, the PWM signal is output based on the output sound data.

Also, in the present embodiment, the PWM signal generation circuit may include a second interruption circuit that outputs a second interruption signal to the processing circuit.

When the PWM signal output circuit is constituted by a hardware circuit different from the processing circuit, the processing circuit cannot know the operating condition of the PWM signal generation circuit, unless the processing circuit is notified of the operating condition of the PWM signal generation circuit by some notification means. According to the present embodiment, the processing circuit can know the operating condition of the PWM signal generation circuit by the second interruption signal.

Also, in the present embodiment, the sound outputter may be an apparatus that outputs sound using a piezoelectric element.

A small-sized speaker or a buzzer using a piezoelectric element can be envisioned as such a sound outputter, for example. There are cases where the small-sized speaker or the buzzer cannot output a portion or the entirety of the voice band. In the present embodiment, even in a case of using such a small-sized speaker or buzzer using the piezoelectric element, since sound is reproduced based on the pseudo sound data in which overtones belonging to the outputtable band are used, a high quality voice can be reproduced.

Also, a sound reproduction device of the present embodiment includes any of the circuit devices described above, and the sound outputter.

Also, an electronic apparatus of the present embodiment includes any of the circuit devices described above.

Note that although an embodiment has been described in detail above, a person skilled in the art will readily appreciate that it is possible to implement numerous variations and modifications that do not depart substantially from the novel aspects and effect of the disclosure. Accordingly, all such variations and modifications are also to be included within the scope of the disclosure. For example, terms that are used within the description or drawings at least once together with broader terms or alternative synonymous terms can be replaced by those other terms at other locations as well within the description or drawings. Also, all combinations of the embodiment and variations are also encompassed in the range of the disclosure. Moreover, the configuration and operation of the circuit device, the sound reproduction device, and the electronic apparatus, and the like are not limited to those described in the present embodiment, and various modifications are possible.

What is claimed is:

1. A circuit device comprising:
   a PWM signal output circuit configured to output a PWM signal to a sound outputter; and
   a processing circuit configured to control the PWM signal output circuit,
   wherein, when a frequency band that the sound outputter can output is denoted as an outputtable band, and a frequency band lower than a lower limit of the outputtable band is denoted as a non-output low frequency band,
   the PWM signal output circuit outputs a PWM signal based on pseudo sound data in which overtones, of a plurality of overtones of a fundamental tone belonging to the non-output low frequency band, that belong to the outputtable band are used,
   wherein, when a frequency band that includes a highest sound pressure peak in frequency characteristics of the sound outputter, is entirely within the outputtable band, and is narrower than the outputtable band, is set as a predetermined band,
   the PWM signal output circuit outputs the PWM signal based on the pseudo sound data in which overtones, of the plurality of overtones, that exclusively belong to the predetermined band are used.

2. The circuit device according to claim 1, wherein a lower limit of the predetermined band is 1 kHz or more.

3. The circuit device according to claim 2, wherein a lower limit of the outputtable band is 500 Hz or more.

4. The circuit device according to claim 1, wherein the pseudo sound data is voice data subjected to high pass filtering processing or band pass filtering processing for allowing the predetermined band to pass.

5. The circuit device according to claim 1,
   wherein the processing circuit issues a command for giving an instruction to output the PWM signal, and
   the PWM signal output circuit, upon accepting the command from the processing circuit, generates the PWM signal from the pseudo sound data, and outputs the generated PWM signal.

6. The circuit device according to claim 1, wherein the PWM signal output circuit includes a sound data output circuit that outputs output sound data based on the pseudo sound data, and a PWM signal generation circuit that generates the PWM signal based on the output sound data.

7. The circuit device according to claim 6,
   wherein the processing circuit issues a command for giving an instruction to output the PWM signal, and
   the sound data output circuit, upon accepting the command from the processing circuit, outputs the output sound data to the PWM signal generation circuit.

8. The circuit device according to claim 7, wherein the sound data output circuit includes a sound decoder that outputs the output sound data by performing processing for decoding the pseudo sound data, and a command control circuit that controls the sound decoder based on the command.

9. The circuit device according to claim 6, further comprising a memory for storing the pseudo sound data,
wherein the sound data output circuit outputs the output sound data based on the pseudo sound data stored in the memory.

10. The circuit device according to claim 6, further comprising an interface circuit for receiving the sound data from an external memory that stores the pseudo sound data,
wherein the sound data output circuit outputs the output sound data based on the pseudo sound data received by the interface circuit.

11. The circuit device according to claim 6, wherein the sound data output circuit includes a first interruption circuit that outputs a first interruption signal to the processing circuit.

12. The circuit device according to claim 6, wherein the PWM signal generation circuit includes:
a sound buffer that buffers the output sound data; and
a PWM conversion circuit that converts the output sound data buffered by the sound buffer to the PWM signal.

13. The circuit device according to claim 6, wherein the PWM signal generation circuit includes a second interruption circuit that outputs a second interruption signal to the processing circuit.

14. The circuit device according to claim 1, wherein the sound outputter is an apparatus that outputs sound using a piezoelectric element.

15. A sound reproduction device comprising:
the circuit device according to claim 1; and
the sound outputter.

16. An electronic apparatus comprising the circuit device according to claim 1.

* * * * *